Figure 1:
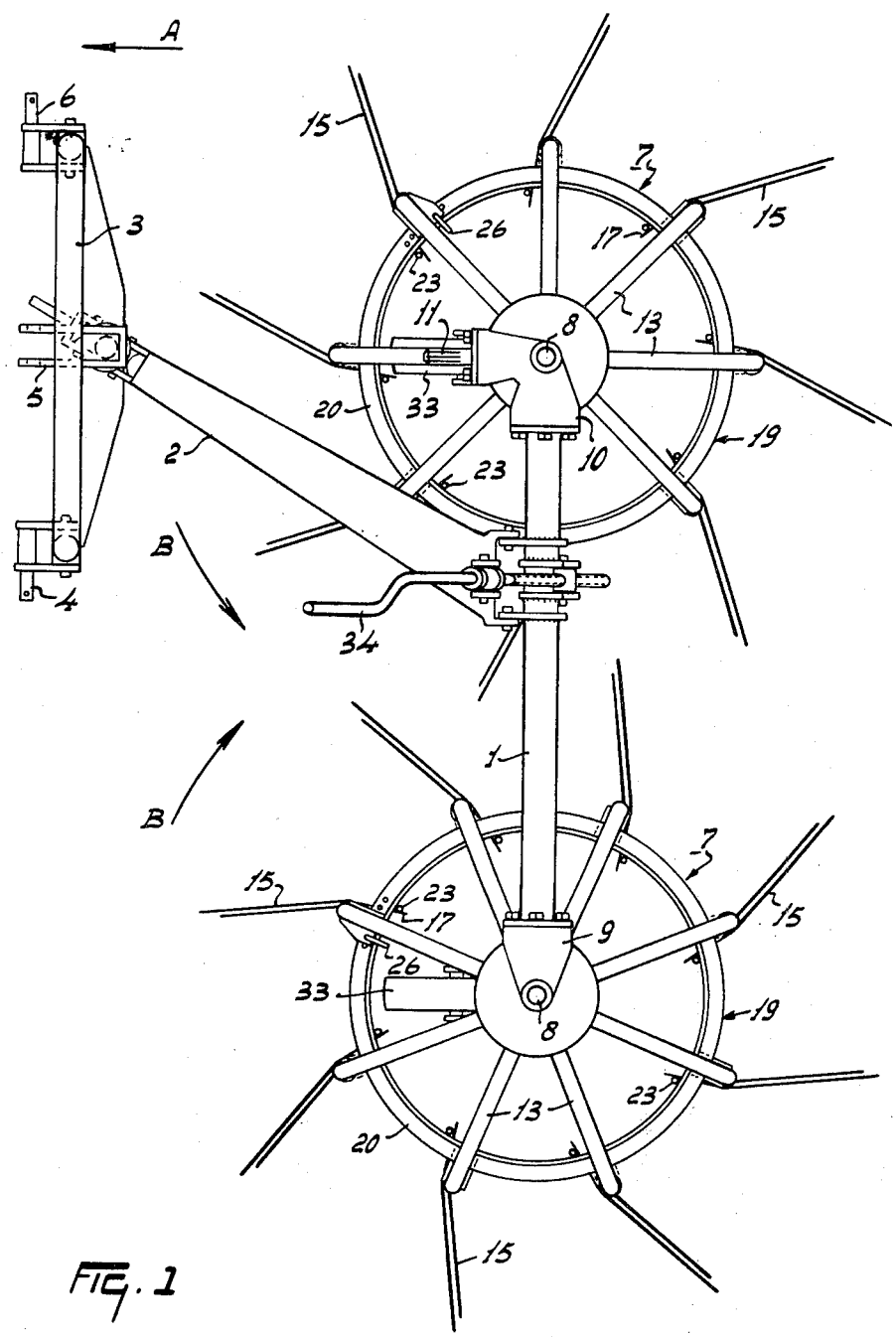

United States Patent [19]
Spindler

[11] 3,910,020
[45] Oct. 7, 1975

[54] LATERAL DISPLACEMENT OF CROP LYING ON THE GROUND

[76] Inventor: John Edward Spindler, Lower Moor Farm, Minetv, Malmesburg, Wiltshire, England

[22] Filed: Nov. 30, 1973

[21] Appl. No.: 420,649

Related U.S. Application Data

[63] Continuation of Ser. No. 298,846, Oct. 19, 1972, abandoned.

[30] Foreign Application Priority Data

Oct. 20, 1971 Netherlands.................... 7114394

[52] U.S. Cl.................................... 56/370; 56/377
[51] Int. Cl............................................ A01d 79/00
[58] Field of Search ............. 56/370, 377, 400, 365

[56] References Cited
UNITED STATES PATENTS

| | | | |
|---|---|---|---|
| 3,579,972 | 5/1971 | Sears.................................... | 56/370 |
| 3,664,106 | 5/1972 | Maugg................................... | 56/370 |

*Primary Examiner*—Louis G. Mancene
*Assistant Examiner*—J. M. Eskovitz
*Attorney, Agent, or Firm*—Mason, Mason & Albright

[57] ABSTRACT

A raking implement has one or more rake wheels with tines that displace crop lying on the ground. The tines are movable to different working positions and/or inoperative, i.e. transport position. The rake wheel is turnable on a non-horizontal axis and the tines can be mounted on arms, one or more parts of which are interconnected with a ring element. The tines are spring-biased to a retracted position so that the ring element acts as a stop. Upon rapid rotation, the tines move outwardly to working positions by centrifugal forces exceeding the bias of the springs whereupon the ring element, or structure associated with same, again acts as a stop. Adjustment means to position the arms and/or tines relative to the ring element are provided so that the working positions of the tines can be chosen. The rake wheel or wheels are mounted on a frame which is attachable to the rear of a prime mover. The frame has beams that are linked to one another for changing the relative position of the rake wheel or wheels to the prime mover. A swatch board can be used in combination with the rake wheel to form a single swath or window.

24 Claims, 12 Drawing Figures

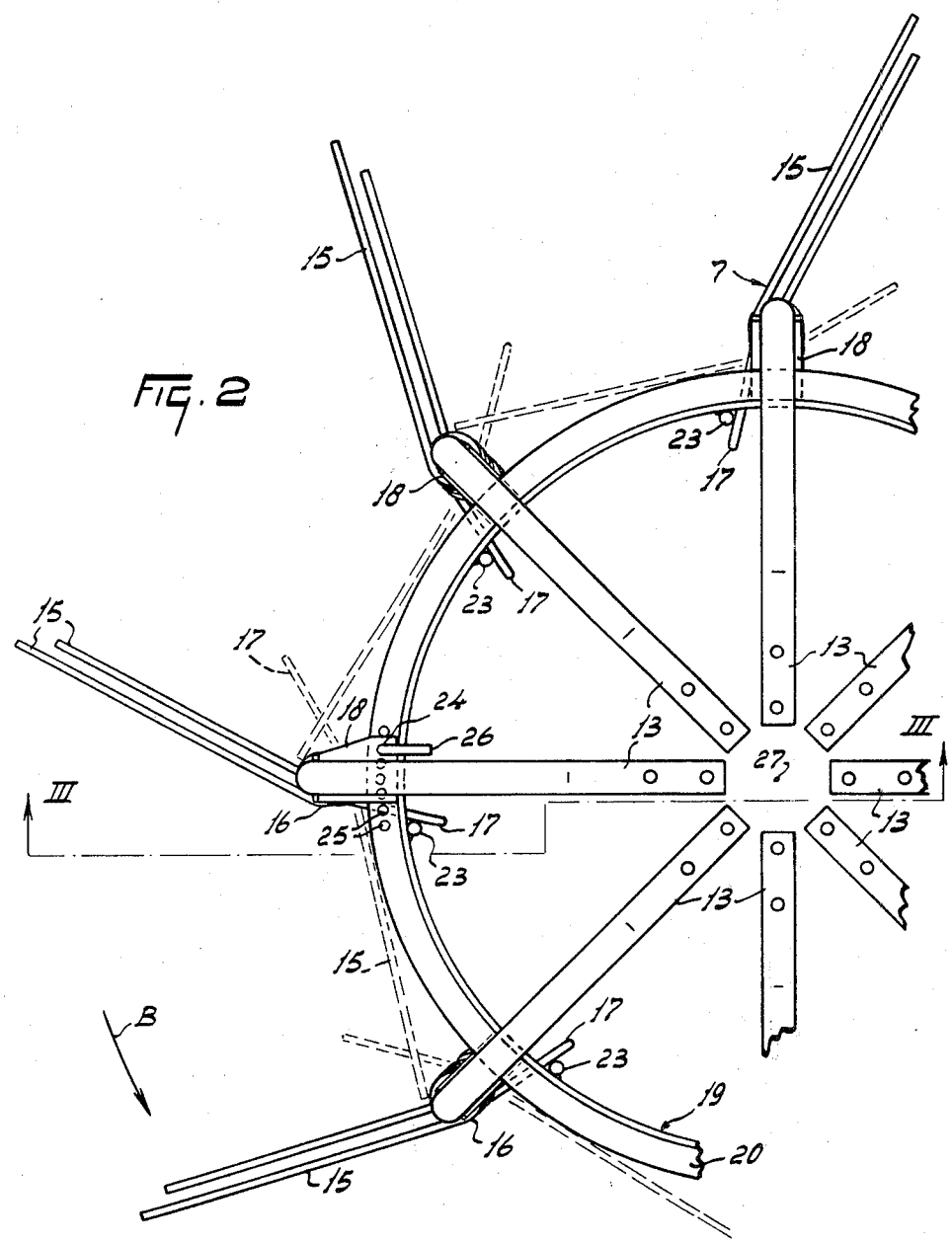

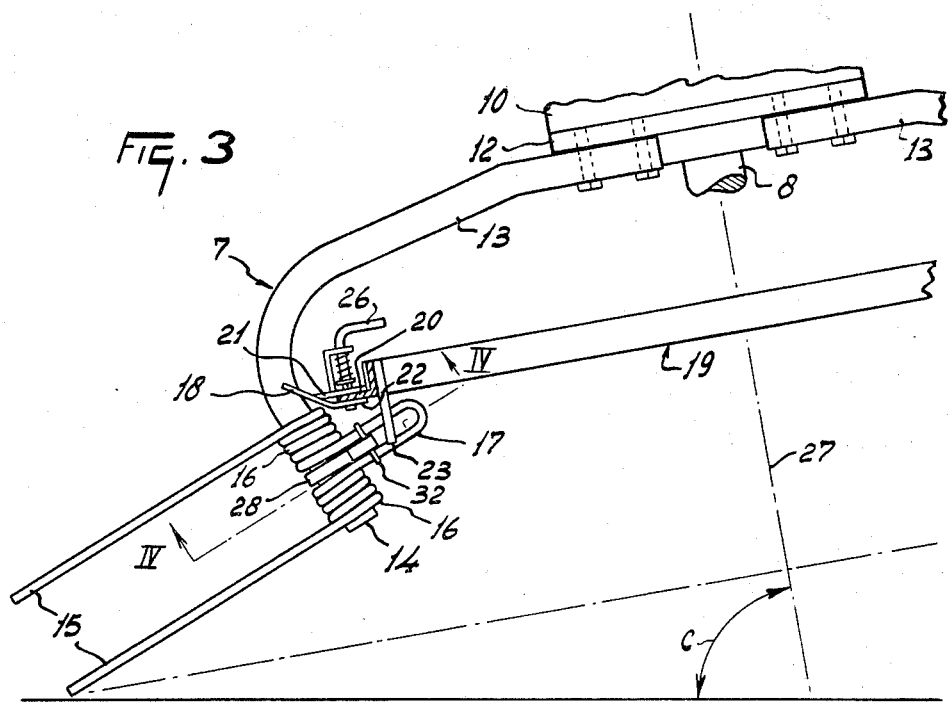
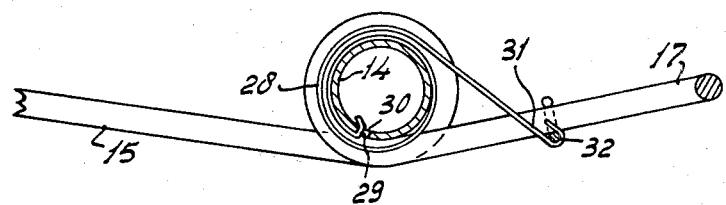
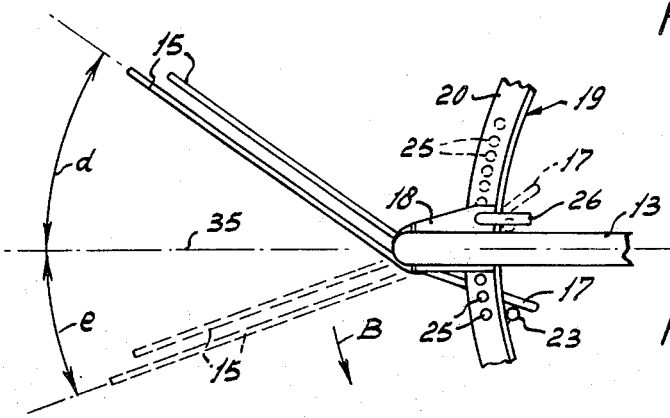

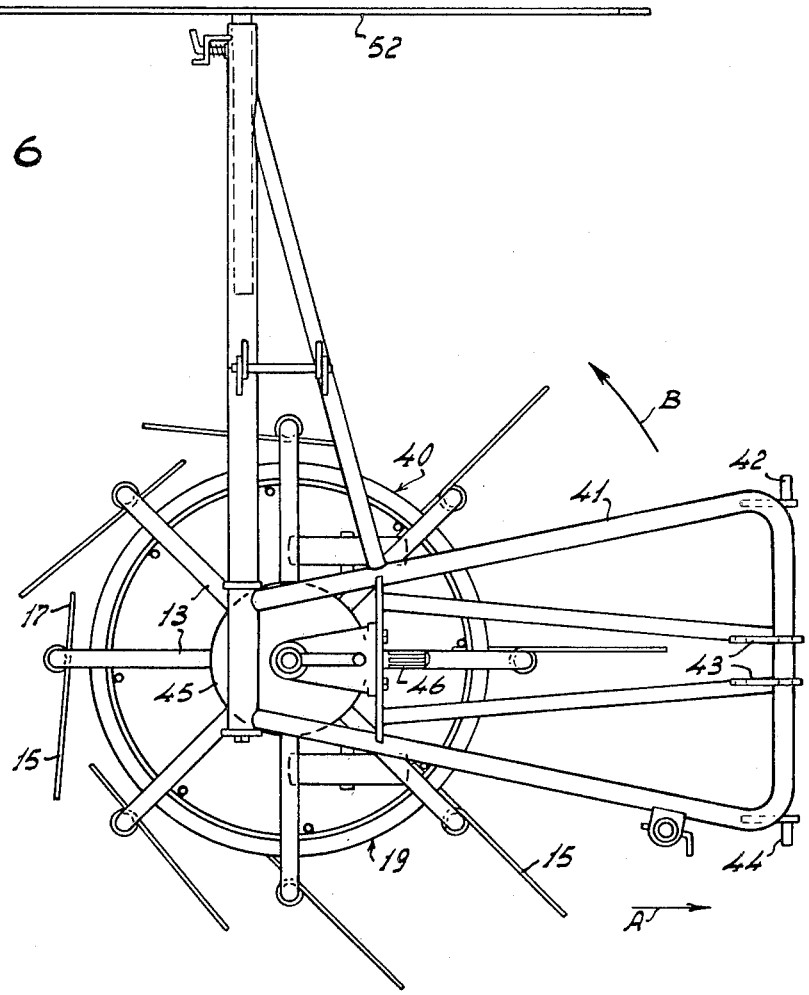
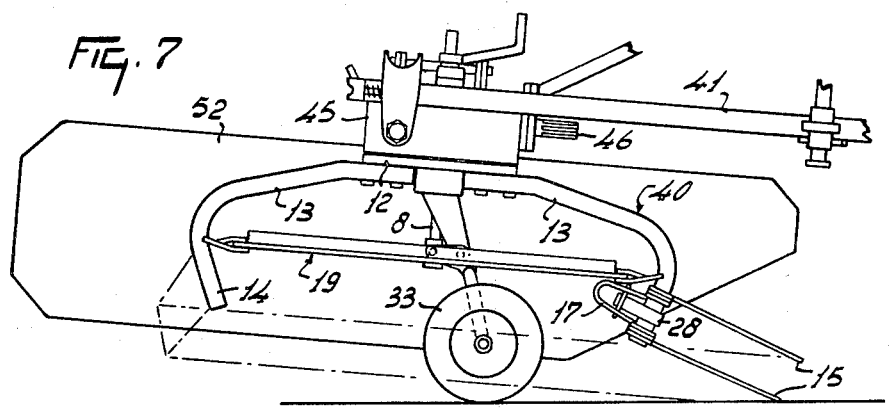

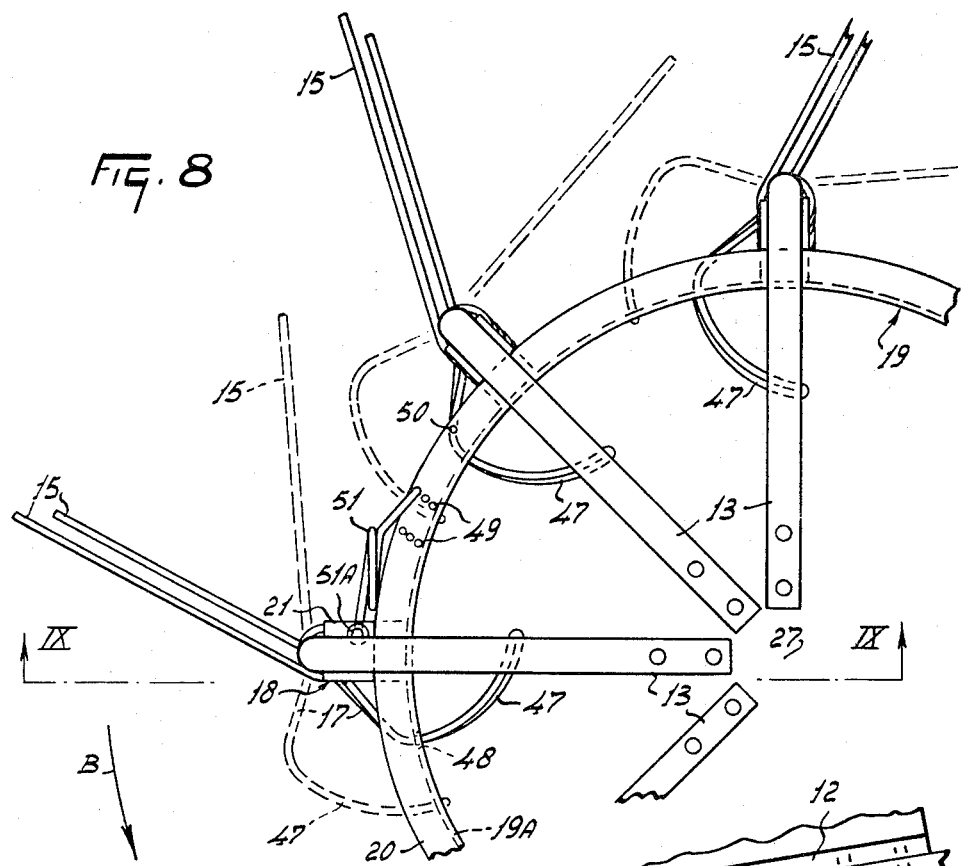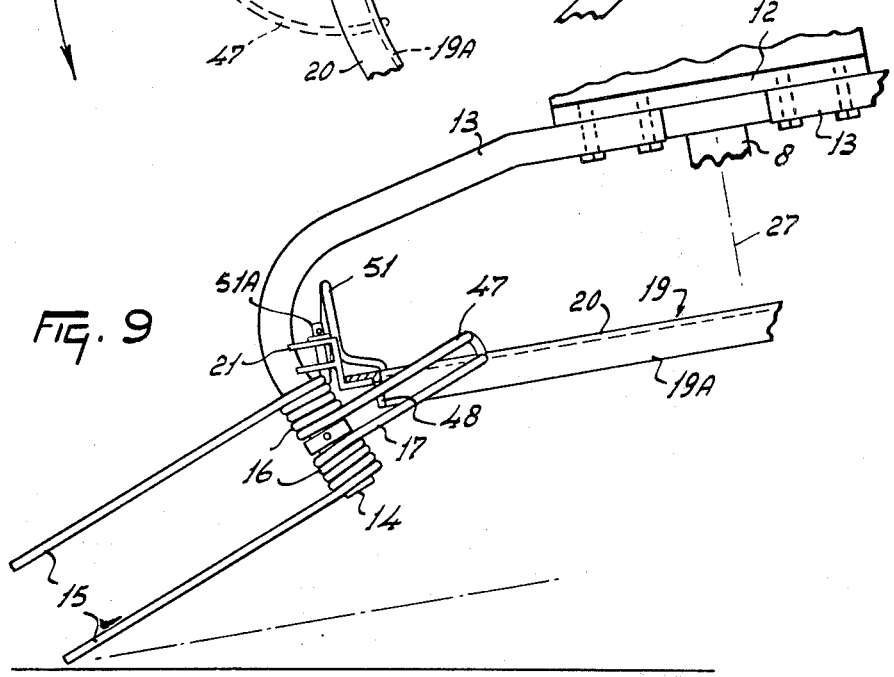

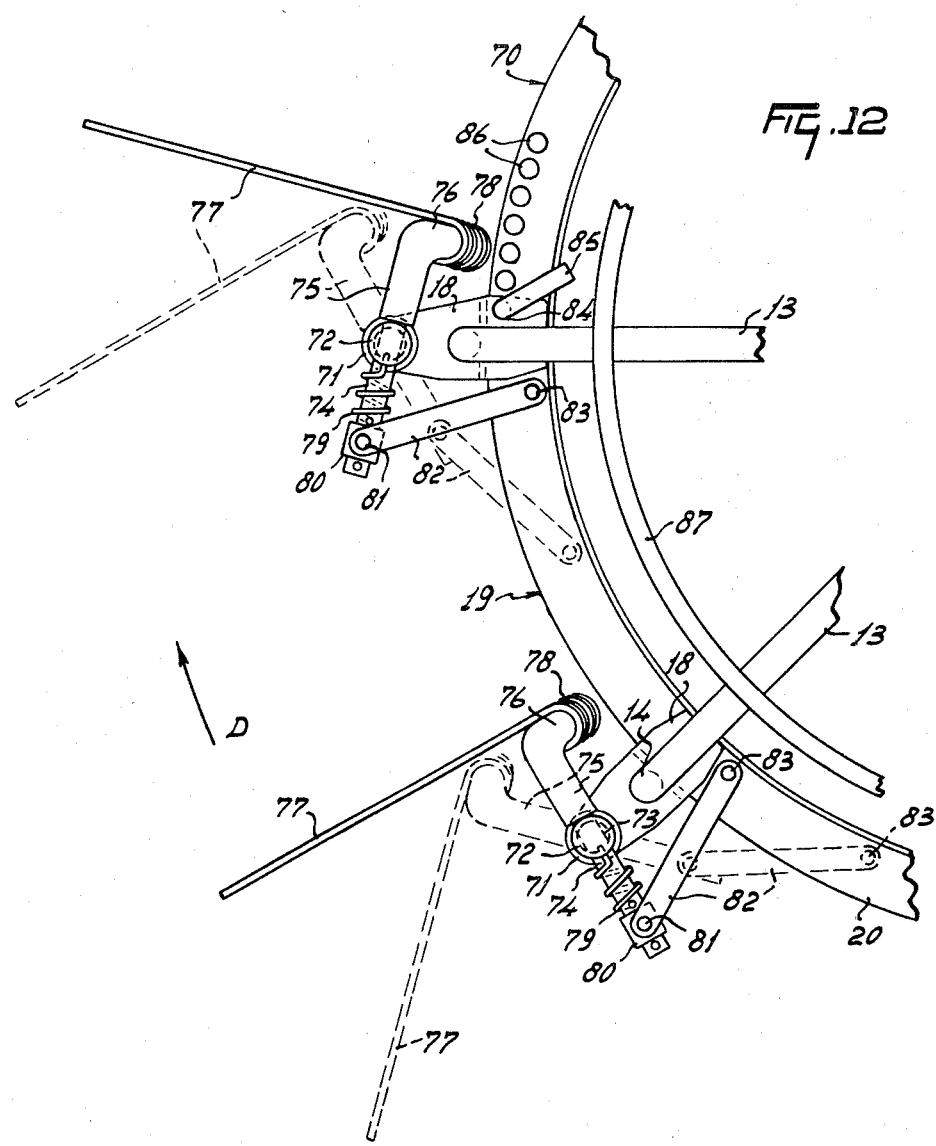

LATERAL DISPLACEMENT OF CROP LYING ON THE GROUND

This is a continuation application of Ser. No. 298,846 filed Oct. 19, 1972 and now abandoned.

According to one aspect of the invention, there is provided an implement for the lateral displacement of crop lying on the ground, the implement comprising at least one tined rake member which is rotatable about an axis that intersects the ground surface, wherein the tines are pivotable singly or in groups, relative to the remainder of the rake member, between working and inoperative positions, and wherein means is provided by which all of the tines can be turned simultaneously between at least two different working positions with respect to lines that extend radially from the axis of rotation to intersect the tips of the tines when those tips are disposed at their radially outermost points.

With known implements which employ one or more rake heads or other rake members that are rotatable about substantially vertical or at least upright axes, there is a danger than the rake member tines will touch the ground and become damaged, or themselves damage turf or other growing plants in the event that the rake members are not rotated during inoperative transport of the raking implement. This danger can be avoided, or greatly reduced, with a construction in accordance with the invention in which the tines are automatically retracted, or are manually retractable, when the or each rake member is at rest. A construction in accordance with the invention may be employed in a rake member in which the tines project downwardly towards the ground and are all located in an imaginary conical surface. It is preferred that, in their inoperative positions, the tines should extend tangentially with respect to a circle centered upon the axis of rotation of the corresponding rake member as viewed lengthwise of that axis. The overall diameter is thus reduced to a minimum value.

A construction can be employed in which the tines are turnable about substantially horizontal axes and a construction can be employed in which they are turnable about upright axes that are contained in an imaginary inverted conical surface whose angle of conicity is between 90° and 150° but preferably has a value of substantially 130°. With such an arrangement, the tines may be held in their working positions solely by the centrifugal forces which act upon them during rotation of the rake members but there may be some tendency to vibration in certain working positions when the tines meet undulations in the ground surface or other obstacles. In order to prevent or minimise such vibration, the tines preferably bear against stops in their working positions, these stops acting to prevent angular displacement of the tines in one direction which direction is preferably the intended direction of rotation of the corresponding rake head or other rake member. Springs may conveniently be employed to move the tines back into their inoperative transport positions and they are preferably wound helically around arms which constitute the pivotal axes of the tines, said springs acting between the arms themselves and the tines or extensions of the latter. In the event that each arm has two tines that are connected thereto by helical portions, the corresponding spring preferably engages the arm between those helical portions. In accordance with one feature of the invention, the resilient effect of each spring may be changed by displacing its point of application of the corresponding tine or tines.

Figure 10:
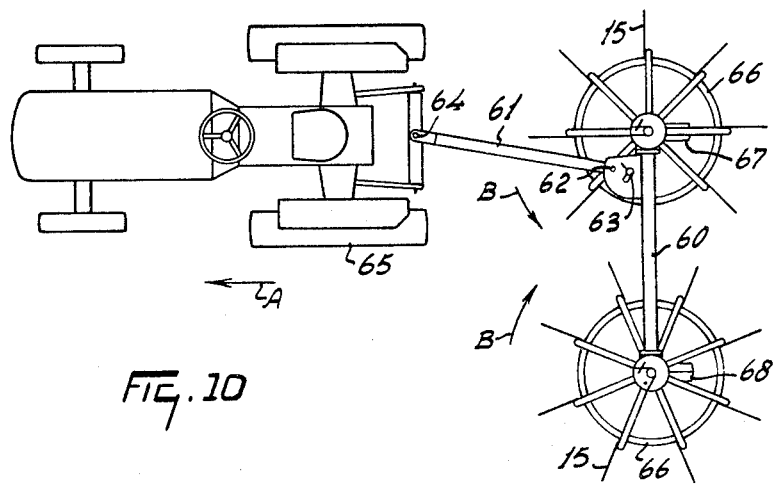
Figure 11:
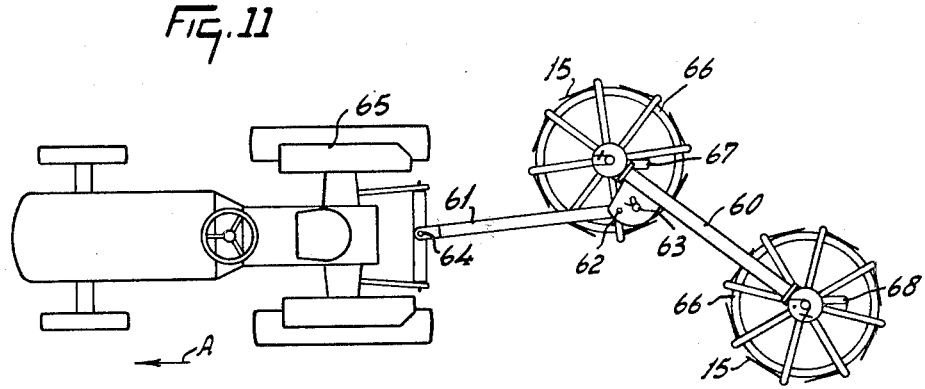

For a better understanding of the invention, and to show how the same may be carried into effect, reference will now be made, by way of example, to the accompanying drawings, in which:

FIG. 1 is a plan view of a raking implement in accordance with the invention,

FIG. 2 is a scrap plan view, to an enlarged scale, showing further details of parts of one of the rake heads of the implement of FIG. 1, FIG. 3 is a section taken on the line III—III of FIG. 2, FIG. 4 is a section, to an enlarged scale, taken on the line IV—IV of FIG. 3 with the omission of some parts, FIG. 5 is a scrap plan view illustrating possible working positions of a ground of tines of one of the rake heads, FIG. 6 is a plan view of a second raking implement in accordance with the invention, FIG. 7 is a side elevation corresponding to FIG. 6, FIG. 8 is a scrap plan view, to an enlarged scale, showing further details of parts of the rake head of the implement shown in FIGS. 6 and 7, FIG. 9 is a section taken on the line IX—IX in FIG. 8, FIG. 10 is a plan view of a raking implement similar, but not identical, to the implement of FIG. 1 connected in a working position to the rear of an agricultural tractor, FIG. 11 corresponds to FIG. 10 but shows the implement in a non-operative transport position, and FIG. 12 substantially corresponds to FIG. 2 but shows an alternative rake head construction.

Referring to FIGS. 1 to 5 of the drawings, the raking implement which is illustrated has a frame which comprises a main beam 1 that extends substantially horizontally perpendicular to the intended direction of operative travel of the implement which is indicated by an arrow A in FIG. 1. A frame beam 2 projects forwardly from the beam 1 at an angle to the direction A, the connection between the two beams 1 and 2 being such that the beam 2 is turnable relative to the beam 1 about an axis that extends substantially parallel to the length of the beam 1, adjusting means which includes a manually operable adjusting crank 34 being provided to produce and maintain a required angular setting of the beam 2 about said axis with respect to the beam 1. The connection between the beams 1 and 2 and the construction of the adjusting means which includes the crank 34 is known per se and is adequately disclosed in FIG. 1 of the drawings. The leading end of the beam 2 with respect to the direction A is connected to a frame part in the form of a coupling member 3 which includes lower horizontal aligned pins 4 and 6 and an upper connecting bracket 5 formed with horizontally aligned holes. The coupling member 3 is constructed to co-operate in known manner with the three-point lifting device or hitch (not shown) of an operating tractor or other vehicle. The implement has two rake members in the form of rake heads (or rake wheels) 7 each of which is rotatable about the axis 27 (FIG. 3) of a corresponding upright shaft 8 which, during operation of the implement, is gently inclined to the vertical. Gear boxes 9 and 10 respectively are disposed above the hubs of the two rake heads 7, the gear box 10 being provided with a rotary input shaft 11 that projects forwardly therefrom in substantially the direction A. The gear boxes 9 and 10 contain meshing bevel pinions and are shown only in outline in the drawings. The main frame beam 1 is of hollow tubular construction and a transmission shaft extends axially therethrough so that the moving parts in the gear box 9 may be driven from those in the gear box 10. The rotary input shaft 11 is intended to be placed in driven connection with the power take-off shaft of an operating tractor or other vehicle to which the coupling member 3 is connected in the use of the implement with the aid of an intermediate telescopic transmission shaft (not shown) of known construction having universal joints at its opposite ends. The arrangement of the gear boxes 9 and 10 is preferably, but not essentially, such that the two rake heads 7 rotate in the relatively opposite directions B that are shown in FIG. 1 of the drawings so that for instance the implement can be employed readily for the spreading of swaths of hay or other crop. The working width of the implement in a horizontal direction perpendicular to the direction A is substantially 360 centimeters and this width is sufficient to enable the implement to work three neighbouring swaths of crop simultaneously when those swaths are spaced apart from one another by conventional distances.

Each rake head 7 has a hub 12 (FIG. 3) to which a plurality (preferably eight) of spoke-like arms 13 are bolted so as to extend radially with respect to the axis 27 when viewed in the direction of that axis. Each arm 13 has a downwardly orientated outer end 14 to which a corresponding group of tines 15 is connected. Each group of tines 15 is formed integrally from, for example, a single length of spring steel wire or rod and comprises two spring portions 16 that are oppositely wound around the corresponding arm end 14. The winding is sufficiently loose to enable the group of tines 15 to turn about the axis of the arm end 14. The two spring portions 16 are integrally interconnected by a loop portion 17 that extends away from the arm end 14 in a direction substantially, but not exactly, opposite to the main cropworking portions of the tines 15 (see FIG. 14). The main crop-working portions of the tines 15 that have just been mentioned extend substantially perpendicular to the corresponding arm end 14 in this embodiment and a straight line interconnecting the tips of those portions extends substantially parallel to the longitudinal axis of the arm end 14 concerned.

Each arm 13 has a corresponding guide 18 secured to it and all the guides 18 co-operate in supporting a ring-shaped element 19 of the rake head that is disposed substantially perpendicular to the axis 27 and whose center substantially coincides with that axis. The ring-shaped element 19 is of right-angled cross-section and the substantially horizontal limb 20 thereof, which extends radially outwardly from the substantially vertical limb thereof, is received between vertically spaced apart upper and lower portions 21 and 22 respectively of each guide 18. As viewed in side elevation, the element 19 is preferably located at a distance from the hub 12 along the axis 27 which is not greater than the similarly measured distance between the hub 12 and the uppermost winding of each upper spring portion 16. The ring-shaped element 19 is provided with a number of downwardly orientated projections 23 that is equal to the number of arms 13. One of the guides 18 is formed with a hole 24 which extends through both the upper and lower portions 21 and 22 thereto and the substantially horizontal limb 20 of the ring-shaped element 19 is formed with a row of holes 25 in the region of that particular guide 18. A substantially vertical lockin pin 26 is provided for downward entry through the hole 24 and a chosen one of the holes 25 to retain the element 19 in a corresponding angular setting about the axis 27 with respect to the arms 13 of the rake head 7.

It can be seen from FIG. 4 of the drawings that each group of tines 15 is provided with a corresponding spirally wound spring 28 that is preferably of flap strip-like formation, the spring being wound around the corresponding arm end 14 between the two spring portions 16 of the tines 15. Each spring 28 has a bent-over inner end 29 that is entered in a small hole 30 formed through the tubular material of the arm end 14. The opposite outer end 31 of each spring 28 projects away from the arm end 14 and is bent over into engagement with an eye 32 that is fastened around the two limbs of the corresponding loop portion 17 of the tine group 15 concerned. The arrangement of the springs 28 is such that each spring tends to turn the corresponding group of tines 15 in an anti-clockwise direction about its supporting arm end 14 as seen in FIG. 4 of the drawings, the turning effect of the springs 28 being capable of being increased or decreased by displacing the corresponding eyes 32 along the loop portions 17 as may be required.

The implement has two ground wheels 33 (FIG. 1) which are arranged beneath the corresponding rake heads 7 as viewed in plan, said ground wheels 33 being rotatably connected to bracket coupled to the lower ends of the non-rotatable shafts 8 that afford the axes of rotation 27 of the two rake heads 7. As previously mentioned, the axes of rotation 27 are gently inclined to the vertical and the adjusting mechanism which includes the afore-mentioned crank 34 can be operated to change the inclination. When the implement is in use, the angle C (FIG. 3) between each axis of rotation 27 and the horizontal ground surface will preferably have a value of substantially 85° but it is emphasised that this angle can be changed as required to suit the nature and condition of the particular crop that is to be worked and may have a lower value such as, for example, substantially 60°. FIG. 5 of the drawings illustrates some possible working positions of one of the groups of tines 15. The springs 28 tend to turn the loop portions 17 of the various tine groups 15 in anti-clockwise directions about the corresponding arm ends 14 as seen in FIGS. 2, 4 and 5 of the drawings and, when the rake heads 7 are not rotating, the groups of tines 15 normally occupy substantially the positions thereof that are shown in broken lines in FIG. 2 of the drawings, these retracted inoperative positions of the tines being maintained by the springs 28 and being such that the tips of the crop working portions of the tines 15 bear against the spring portions 16 of their neighbours so as to prevent the springs 28 from becoming unwound to an excessive extent. When the rake heads 7 are rotated, centrifugal forces acting upon the tines 15 bring them into the working positions that are shown in full lines in FIG. 2 of the drawings against the action of the various springs 28, that particular working positions which are adopted by the tines being dictated by the projections 23 of the element 19 against which projections the loop portions 17 abut after the tines 15 have been turned centrifugally. Referring again to FIG. 5 of the drawings, the tines 15 can, in this embodiment, occupy working positions in which they are inclined forwardly with respect to the direction B from an imaginary line 35 that extends radially from the corresponding axis 27 along one of the arms 13 to intersect the axis of the corresponding arm end 14 when viewed lengthwise of the axis 27 (FIG. 5). Alternatively, the tines 15 can be inclined rearwardly from said line 35 with respect to the direction B. The imaginary radial line 35 makes an angle of about 35° with the main crop-working portion of the upper tine of each tine group 15 (see FIGS. 3 and 5). In the embodiment which is being described, the main crop working portions of the tines 15 can be inclined forwardly from the line 35 in the direction B by an angle having as great a magnitude as the angle $e$ as shown in FIG. 5 of the drawings or can be inclined rearwardly from said line 35 by an angle having as great a magnitude as the angle $d$ that is also shown in FIG. 5. In the particular embodiment which is being described, the angle $d$ has a magnitude of substantially 35° and the angle $e$ has a magnitude of substantially 20°, the tines 15 being capable of occupying a number of different positions between the extreme positions shown in full and broken lines respectively in FIG. 5 in dependence upon the particular hole 25 in the element limb 20 that is chosen to co-operate with the hole 24 and locking pin 26. The position of the tines 15 in which they are inclined forwardly with respect to the direction B from the radial line 35 which is shown in broken lines in FIG. 5 of the drawings is to be preferred for tedding operations of the implement whereas the rearwardly inclined position which is shown in full lines in FIG. 5 is to be preferred for windrowing operations of the implement. As previously mentioned, when the rake heads 7 are at rest, the springs 28 maintain the tines 15 in approximately the positions thereof that are shown in broken lines in FIG. 2 of the drawings in which position said tines extend substantially tangentially with respect to a circle centered upon the axis of rotation 27 in this particular embodiment. The rake head 7 has its minimum overall diameter under these conditions but, if desired, the construction may be such that the tines 15 are turned inwardly of the rake head to a lesser extent by the springs 28 than that illustrated in FIG. 2. With such a construction, appropriate stops are required to limit the turning movements of the tines 15 about the arm ends 14, it being remembered that the spring portions 16 of neighbouring tines 15 serve this function when the arrangement is that shown in FIG. 2.

When the rake heads 7 are rotated, centrifugal forces turn the tines 15 about the arm ends 14 against the action of the springs 28 into working positions which may be any of those shown in full or broken lines in FIG. 5 or in full lines in FIG. 2. It will be realised that both air resistance and the resistance to displacement of the crop which is engaged by the tines 15 will cause them to be turned about the arm ends 14 beyond truly radial positions to, for example, the position shown in full lines in FIG. 5. The engagement of the loop portions 17 with the downward projections 23 prevents pivotal displacement of the tines 15 beyond the settings dictated by the particular hole 25 that is chosen to cooperate with the hole 24 and the locking pin 26. The working position of all of the tines 15 that will be adopted during rotation of each rake head 7 about the corresponding axis 27 is pre-set by a single adjustment of the ring-shaped element 19 to change the position of all of the projections 23 relative to the arms 13. It will be noted that the axes of the arm ends 14 about which the groups of tines 15 are turnable all intersect a plane that is perpendicular to the axis of rotation 27 so that the single adjustment for the angle of attack of the tines 15 that has just been described can be accomplished in a simple manner. A similar construction may be employed if each arm 13 is provided with only a single tine. When the rake heads 17 come to rest, the tines 15 are turned automatically back into inoperative positions suitable for transport of the implement by the springs 28, such inoperative transport position of the tines being shown in broken lines in FIG. 2 of the drawings. With the construction which has been described, the tines 15 automatically adopt positions suitable for inoperative transport of the implement and also move automatically into working positions as soon as the rake heads 7 are rotated, such working positions having been pre-set to suit the particular crop and operating conditions by a single prior adjustment of the element 19 relative to the guides 18.

In the embodiment which has been described above, the springs 28 are quite weak so that the centrifugal forces which act upon the tines 15 during rotation of the rake heads 7 are sufficient to turn them about the arm ends 14 into their working positions against the opposition of the springs 28. As an alternative, the springs 28 may be stronger so that the centrifugal forces alone are insufficient to turn the tines 15 about the arm ends 14. The tines 15 may then be so arranged that they project outwardly from the arm ends 14 just far enough to enable them to engage hay or other crop which is to be displaced during the operation of the implement. The resistance of the engaged crop to displacement by the tines 15 will then have the effect of turning those tines about the arm ends 14 into one of the working positions that has been described and illustrated. The arrangement has the advantage that, after the tines 15 have been in displacing engagement with crop during a part of each rotation of each rake head 7, they automatically return to substantially inoperative positions that are generally similar to the positions thereof that are shown in broken lines in FIG. 2 of the drawings, the hay or other crop that is engaged by the tines 15 being thrown clear of those tines. Such a construction has advantages when the implement concerned comprises only a single rake head rather than the two co-operating rake heads of the implement of FIGS. 1 to 5. An implement of the kind having only a single rake head is shown in FIGS. 6 to 9 of the drawings, this type of implement having the advantage that no socalled "driving" or "steering" means is required to alter the angular settings of the tines during rotation of the rake head as is employed in the majority of known raking implements having only a single large rake head.

FIGS. 6 to 9 of the drawings illustrate a raking implement in accordance with the invention having only a single rake member in the form of a rake head or rake wheel 40. The rake head 40 is rotatably mounted in a frame 41 whose leading end, with respect to the intended direction of operative travel of the implement A, is provided with horizontally aligned lower coupling pins 42 and 44 and an upper coupling bracket 43 formed with horizontally aligned holes. The pins 42 and 44 and the bracket 43 can be connected to the three-point lifting device or hitch of an agricultural tractor or other operating vehicle in a known manner. A gear box 45 is disposed above the single rake head 40 and is provided with a rotary input shaft 46 that projects forwardly therefrom in substantially the direction A, said input shaft 46 being intended to be placed in driven connection with the power take-off shaft of the agricultural tractor or other operating vehicle by way of an intermediate telescopic transmission shaft of known construction having universal joints at its opposite ends. The rake head 40 is similar in many ways to the two rake heads 7 that have previously been described and, accordingly, similar or identical parts to those that have been described above are designated in FIGS. 6 to 9 of the drawings by the same reference numerals as are employed in FIGS. 1 to 5 of the drawings. The rake head 40 that is shown in FIGS. 6 and 7 of the drawings has substantially the same construction as each rake head 7 but the rake heads 40 that are shown in FIGS. 8 and 9 of the drawings can, as an alternative, be employed. Each loop portion 17 of the tines 15 in the embodiment of FIGS. 8 and 9 of the drawings has a curved extension 47 and the ring-shaped element 19 has a radially inner substantially vertical limb 19A that extends downwardly from the inner edge of the substantially horizontal limb 20. Gaps 48 are formed in the substantially vertical limbs 19A at regular intervals and two sets of holes 49 and a single additional hole 50 are formed through the substantially horizontal limb 20 at the positions which can be seen in FIG. 8 of the drawings. A coiled spring 51 has one end 51A pivotally connected to one of a number of guide brackets 21A (corresponding to the previously described guides 18) and its opposite end can be entered into any chosen one of the holes 49 or in the hole 50. The springs 28 are omitted in this construction but the tines 15 can be brought to inwardly directed inoperative positions by turning the ring-shaped element 19 manually until the free end of the spring 51 can be entered in the single hole 50. This turning movement of the element 19 causes the edges of the gaps 48, through which the tine extensions 47 are entered, to bear against those extensions and to pivot the tines 15 about the arm ends 14 until the inoperative broken line positions that are shown in FIG. 8 of the drawings are attained, these positions being maintained by abutment of the extensions 47 against the edges of the gaps 48. With the arrangement shown in FIGS. 6 and 7 of the drawings, the crop working portions of the tines 15 project forwardly with respect to the direction of rotation B but they extend rearwardly with respect to that direction in the rake head construction of FIGS. 8 and 9. With this latter construction, the tines 15 are turned outwardly towards their operative position by centrifugal forces until the junctions between the loop extensions 47 and the main portions of the loops 17 themselves come into abutting engagement with the edges of the gaps 48 which thus afford stops. Different working positions of the tines 15 appropriate to various crops and operating conditions can be attained by entering the free end of the spring 51 in different holes 49. A substantially vertical swath board 52 that extends substantially parallel to the direction A is arranged at the left-hand side of the implement as viewed in the direction A. The spacing of the swath board 52 from the axis of rotation 27 of the rake head 40 can be adjusted in the manner shown in outline in FIG. 6 of the drawings and, when the swath board 52 is not in use, it can be turned upwardly through approximately 180° about a pivot extending substantially parallel to the direction A into an inverted position in which it lies on top of the frame 41 above the gear box 45. The tines 15 engage hay or other crop lying upon the ground in a forward region of the rake head 40 with respect to the direction A and displace the crop laterally towards the swath board 52 which acts to form that crop into a single swath or windrow. When the swath board 52 is not employed, the crop will be scattered substantially at random over the ground.

FIG. 6 of the drawings shows one of the previously described arrangements for the tines 15 in which they are automatically retracted into substantially inoperative positions except during engagement with the crop throughout a forward region of the rake head 40 with respect to the direction A.

FIGS. 10 and 11 of the drawings illustrate a raking implement which is similar, but not identical, to the implement of FIGS. 1 to 5. The implement of FIGS. 10 and 11 comprises a main frame beam 60 to which a draw bar 61 is connected so as to be turnable with respect to the frame beam about a substantially vertical pivot 62. A vertical locking pin 63 is provided to enable the draw bar 61 to be retained in any chosen one of at least two different angular settings about the pivot 62 relative to the main frame beam 60. The implement is shown connected to a tool bar or the like at the rear of an agricultural tractor 65, the connection being afforded by a substantially vertical hitch pin 64 about which the whole implement can turn relative to the tractor 65. The tool bar or the like is itself turnable with respect to the remainder of the tractor 65 about a substantially horizontal axis. The implement has two rake heads 66 that are arranged to be mechanically rotated in opposite directions B from the power take-off shaft of the tractor 65 by a transmission which is not illustrated in FIGS. 10 and 11. The two rake heads 66 have tines 15 that may either be of the previously described type which are displaced centrifugally into operative positions by rotation of the two rake heads 66 or of the type where a single manual adjustment is necessary to move them from an inoperative position to an operative position or vice versa. The implement has two ground wheels 67 and 68 located beneath the respective rake heads 66 and it will be noticed that the two ground wheels trail with respect to the direction A rather than lead with respect to that direction as is the arrangement with the previously described ground wheels 33 shown in FIGS. 1, 6 and 7 of the drawings. The ground wheel 67 is a castor wheel which is, however, provided with means to retain its plane of rotation in a fixed angular setting about a substantially vertical axis. The trailing ground wheel 68 is arranged so that its plane of rotation can be retained in either of two different angular settings about a corresponding substantially vertical axis. The locking means corresponding to the two ground wheels 67 and 68 can be seen in outline above the central regions of the two rake heads 66. FIG. 10 of the drawings shows the implement occupying a working position in which the main frame beam 60 extends substantially perpendicular to the direction A and the planes of rotation of both ground wheels 67 and 68 are retained in settings in which they are substantially parallel to that direction. FIG. 11 of the drawings shows an inoperative transport position of the implement in which the draw bar 61 occupies an alternative angular setting with respect to the main frame beam 60, the ground wheel 67 is released to allow it to castor freely, and the ground wheel 68 has its plane of rotation retained in the second possible setting with respect to the remainder of the implement. The main frame beam 60 is steeply inclined to the direction A in the inoperative transport position shown in FIG. 11 and it will be seen from that Figure that the path of travel of the implement is greatly reduced to a width which is little more than the width of the path of travel of the tractor 65 itself. The disposition of the tines 15 in their inwardly withdrawn inoperative positions further reduces the width of the implement in its inoperative transport position and enables the implement to be towed through gateways and along public roads and the like without danger.

FIG. 12 of the drawings illustrates an alternative rake head construction which is particularly, but not exclusively, suitable for use in an implement having two rake heads. Parts which are similar, or identical, to parts that have already been described are designated in FIG. 12 by the same reference numerals as have been employed in the preceding Figures of the drawings. The single rake head is generally indicated by the reference 70 and comprises the previously spoke-like arms 13. However, in this case, the outer ends 14 of the arms 13 extend substantially perpendicular to the plane of rotation of the rake head and thus substantially parallel to its axis of rotation. The guides 18 support the ring 19 in the same way as has previously been described but an outer region of each guide 18 carries a corresponding sleeve bearing 71 in which a corresponding shaft 72 is turnable. Each shaft 72 is formed, above the corresponding bearing 71, with a perpendicularly transverse aperture 73 through which a tine support 74 is entered. Each tine support 74 includes an enlarged portion 75 whose diameter is greater than that of the corresponding aperture 73 so that it bears, in the manner of a stop, agains one side of the shaft 72 around the mouth of the aperture 73. The enlarged portion 75 has a downwardly bent over end 76 to which a single tine 77 is secured. The tine 77 includes a helical portion 78 that is wound around the end 76, said helical portion 78 being clamped to said end 76 by, for example, a transverse bolt (not shown).

The end of the tine support 74 remote from the end 76 has a helical spring 79 wound around it, one end of said spring being engaged in a recess in the shaft 72 while the other end is engaged in a recess in the support 74 itself. The support 74 carries a block 80 adjacent the end thereof furthest remote from the tine 77 and an arm 82 is turnably connected to the block with the aid of a pivot 81 that projects upwardly from the top of the block. The end of the arm 82 that is remote from the block 80 is turnably connected to the substantially horizontal limb 20 of the ring-shaped element 19 by a further upright pivot 83. Means (not visible in FIG. 12) is provided on each shaft 72 beneath the corresponding bearing 71 to prevent said shaft from being displaced upwardly through the bearing. The pivots 81 are disposed outside the ring 19 with respect to the axis of rotation of the rake member. One of the guides 18 of the rake head 70 is formed with a hole 84 and the ring 19 can be turned around the axis of rotation of the rake head to bring any one of a curved row of holes 86 into register with the hole 84, a substantially vertical locking pin 85 being provided to maintain any chosen setting. In this construction, the strength of the rake head 70 is increased by interconnecting outer regions of all of the arms 13 by a ring 87. The ring 87 also serves as a stop for the tines 77 as will become apparent below.

When the rake head 70 is at rest, the springs 79 turn the tine supports 74 about their own longitudinal axes into inoperative positions in which the tines 77 that they carry bear against a stop afforded by the ring 87. The diameter of the rake head 70 is then at a minimum. Upon rapid rotation of the rake head 70, centrifugal forces act upon the tines 77 and cause their supports 74 to be turned about their own longitudinal axes, against the action of the springs 79, to working positions such as the one shown in full lines in FIG. 12 of the drawings. Each tine 77 can, if desired, be provided with an extension that is designed to abut against the corresponding guide 18 and thus limit movement of that tine 77 beyond a predetermined desirable working setting. Different working positions of the tines 77 are possible by turning the shafts 72 about their axes in the sleeve bearings 71 and this is accomplished by withdrawing the locking pin 85, turning the ring-shaped element 19 about the axis of the rake head 70 until a new hole 86 comes into register with the single hole 84, and finally replacing the locking pin 85 through the hole 84 and the newly chosen hole 86. As will be evident from FIG. 12 of the drawings, movement of the element 19 is transmitted to the tine supports 74 by the arms 82, two possible working positions of the tines 77 (with corresponding positions of the supports 74 and arms 82) being shown in FIG. 12 in full and broken lines respectively. A previous discussion of the possible working positions of the tines has been made with particular reference to FIG. 5 of the drawings. The construction illustrated in FIG. 12 allows the tines 77 to be adjusted in a particularly simple manner.

The intended direction of rotation of the rake head 70 is indicated by an arrow D in FIG. 12 of the drawings and it will be noted that the tines 77 are inclined rearwardly with respect to that direction in substantially all of their working positions. The axis of each tine support 74 is inclined to the plane of rotation of the rake head 70 at an angle of not more than 30° and it is, in fact, preferred that said angle should have a value of less than 10°. The various working positions of the tines 77 that are possible are particularly important when an implement in which the rake head 70 is employed is provided, in known manner, with a plurality of guide members arranged to form the hay or other crop that is displaced by the rake member 70, and a companion rake member, into a swath or windrow since the possibility of ready adjustment enables an optimum working position to be adopted having regard to the varying crop and operating conditions.

While various features of the rake members and raking implements that have been described, and/or that are illustrated in the accompanying drawings, will be set forth in the following claims as inventive features, it is to be noted that the invention is not necessarily limited to these features and that it encompasses all of the features that have been described and/or illustrated both individually and in various combinations.

What we claim is:

1. A raking implement for laterally displacing crop lying on the ground comprising a frame and at least one circular tined member being rotatably mounted on said frame, said tined member being rotatable about a non-horizontal axis, and having a plurality of tines pivotally supported on said member adjacent the outer periphery thereof, movable means on said tined member mounted within and adjacent the periphery of said tined member and said means being pivotably linked to said tines, said means being displaceable with respect to the non-horizontal axis for said tined member independently of the tined member to pivot said tines simultaneously to different positions, said tines also being independently pivotable to at least one working position from an inoperative position, responsive to the rotation of said member.

2. An implement as claimed in claim 1, wherein said tines are pivotable to project outwardly with respect to the center of the tined member in one working position thereof.

3. An implement as claimed in claim 2, wherein the tines are pivotable to extend substantially tangentially to a circle centered upon the axis of rotation of said tined member, in the inoperative position of the tines.

4. An implement as claimed in claim 1, wherein said tines are freely pivotable and turnable automatically into at least one working position by the centrifugal forces generated during rotation of the tined member.

5. An implement as claimed in claim 1, wherein said tines are freely pivotable with respect to the remainder of the tined member about upwardly extending axes.

6. An implement as claimed in claim 1, wherein said tines are mounted on supports and said supports have springs that cooperate with the tines and tend to turn same into an inoperative position.

7. An implement as claimed in claim 6, wherein said means is a ring shaped element having stops and the tines engage said stops in at least one working position thereof, said stops being positioned to prevent displacement of said tines in at least one working position thereof, said stops being positioned to prevent displacement of said tines in at least one direction.

8. A raking implement for laterally displacing crop lying on the ground comprising a frame and at least one tined member being rotatably mounted on said frame, said tined member being rotatable about a non-horizontal axis, and having a plurality of tines pivotally supported on said member adjacent the outer periphery thereof, ring-shaped means on said tined member mounted within said tined member and being pivotably linked to said tines, said means being displaceable about said non-horizontal axis for said tined member independently of the tined member, and said tines being simultaneously pivotable to different positions responsive to the movements of said means, when said means is displaced relative to said tined member and said tined member comprising stop means for limiting a working position of said tines, said tines having portions which bear on said tined member in the working position.

9. An implement as claimed in claim 8, wherein said stop means has stops that are positioned to prevent displacement of the tines in a direction opposite to the intended direction of rotation of said tined member.

10. An implement as claimed in claim 8, wherein said ring-shaped means is a ring element with guide means for bearing on said tines in the working position thereof.

11. An implement as claimed in claim 10, wherein said guide means includes a plurality of stops positioned around the periphery of said ring element and against which said tines bear in the working position.

12. An implement as claimed in claim 11, wherein said tines have extensions which contact said stops.

13. An implement as claimed in claim 8 wherein said tined member includes spoke-like arms that extend outwardly from its axis of rotation and said ring-shaped means is supported by said arms.

14. An implement as claimed in claim 8, wherein said implement comprises two tined members mounted on a main beam of said frame, said beam being pivoted to coupling means, whereby, in an operative transport position thereof, one tined member precedes the other with respect to the intended direction of travel.

15. An implement as claimed in claim 14, wherein said implement is coupled to be towed by a tractor and the coupling means comprises a draw bar that can occupy at least two different fixed positions with respect to the remainder of said frame, one of said fixed positions being an inoperative transport position in which one tined member precedes the other.

16. An implement as claimed in claim 15, wherein a ground wheel is located beneath each of said two rake members to support the frame of the implement.

17. An implement as claimed in claim 16, wherein at least one of said ground wheels is a castor wheel that is provided with means to retain its plane of rotation in at least one fixed angular setting with respect to said frame.

18. An implement as claimed in claim 5, wherein said tined members have driven means for connection 15, a power take off on the tractor, said tined members being connected to be driven in relatively opposite directions during operation.

19. An implement as claimed in claim 18, wherein guide members are supported on the frame to the rear of said tined members with respect to the intended direction of operative travel of the implement for forming crop displaced by the tined members during operation into a swath or windrow.

20. A raking implement for laterally displacing crop lying on the ground comprising a frame and at least one tined member being rotatably mounted on said frame, said tined member being rotatable about a non-horizontal axis, and having a plurality of tines pivotally supported adjacent the outer periphery of said member, at least one element mounted within said tined member and being pivotably linked to said tines, said element being displaceable about the non-horizontal axis for said tined member independently of the tined member, said tines being simultaneously pivotable to different positions responsive to the displacement of said element, when said element is displaced relative to said tined member, said element having retaining means to secure said tines in chosen angular settings with respect to the remainder of said tined member.

21. An implement as claimed in claim 20, wherein said tines are pivotable about axes that are contained in a plane extending substantially perpendicular to the axis of rotation of the tined member.

22. An implement as claimed in claim 20, wherein said tines are mounted on supports which are pivotable about axes extending substantially parallel to the axis of rotation of the rake member or corresponding rake member.

23. An implement as claimed in claim 22, wherein said supports are interconnected to said element and the latter is displaceable to pivot said supports and tines, whereby said tines occupy an extended working position.

24. A raking implement for laterally displacing crop lying on the ground comprising a frame and at least one tined member being rotatably mounted on said frame, said tined member being rotatable about a non-horizontal axis, and having a plurality of tines pivotally mounted around the outer periphery of said member, an element mounted within said tined member and being pivotably linked to said tines, said element being rotatable about the non-horizontal axis for said tined member independently of the tined member, and said tines being simultaneously pivotable to different positions responsive to the movements of said element, when said element is rotated relative to said tined member, said tines having curved extensions and said element having openings to receive said extensions when said tines are pivoted to a working position.

* * * * *